June 10, 1924.

N. O. YOUNGSTROM

FASTENER FOR CHAINS

Filed July 10, 1923

1,496,964

Inventor

Nels. O. Youngstrom

By Edgar T Gaddis

Attorney

Patented June 10, 1924.

1,496,964

UNITED STATES PATENT OFFICE.

NELS O. YOUNGSTROM, OF WAHOO, NEBRASKA.

FASTENER FOR CHAINS.

Application filed July 10, 1923. Serial No. 650,646.

*To all whom it may concern:*

Be it known that I, NELS O. YOUNGSTROM, a citizen of the United States, residing at Wahoo, in the county of Saunders and State of Nebraska, have invented certain new and useful Improvements in Fasteners for Chains, of which the following is a specification.

This invention relates to fasteners for chains, and particularly to fasteners for anti-skid chains used on automobile tires. With such devices it is desirable that fasteners be provided which can be readily attached and detached, and which will stay fastened when applied, and which will also serve to draw the chains taut when they are being placed on the tires.

The object of the invention is to provide an improved device having these advantages, and it comprises a lever hook by means of which the two ends of a chain may be drawn together, and provided with a device for engaging the hook to hold the chains in place, and which will not become unfastened in consequence of the motion of the wheels, and which nevertheless can be readily unfastened when the chains are to be taken off.

Figure 1:
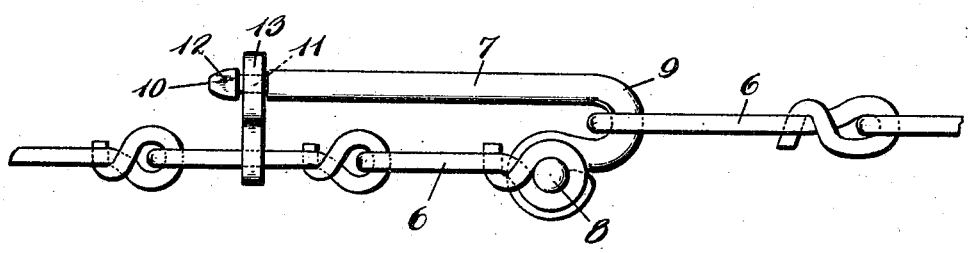
Figure 2:
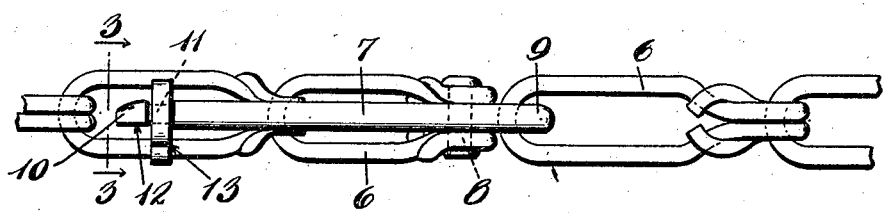
Figure 3:
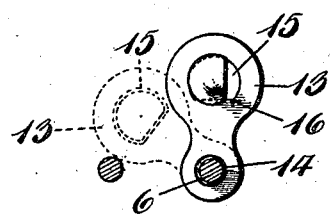

The invention is illustrated in the accompanying drawings in which Fig. 1 is a side view showing the device connecting the adjacent ends of chains. Fig. 2 is a plan view. Fig. 3 is a section on the line 3—3 of Figure 2.

In the drawings, 6 indicates the links of a chain whose ends are to be joined. The link at one end is provided with a lever hook one end of which is attached to the end of the link by a pivot pin 8, so that the hook can swing. The bend of the hook, indicated at 9, is located near the pivot 8, and the straight part of the hook extends far enough to provide a lever portion which can be entered through the link at the opposite end of the chain, and then swung over to draw the ends together, until the last mentioned link slips into and rests in the bend 9 of the hook.

To fasten the hook in the connecting position, as shown in the drawings, it is provided at its free end with a head 10 connected to the lever part of the hook by a neck 11; and this head is flattened on one side as indicated at 12.

A keeper is loosely mounted on one of the links adjacent the end link to which the hook is pivoted, and this keeper comprises a loop or device, 13, having a hole 14 through which one branch of the link 6 extends so that the keeper is free to swing on the link and also to slide lengthwise thereof. The keeper is also provided with a hole 15, the edge of which is flattened at one side, as indicated at 16. The hole is of such size that the head 10 can be entered through the same when the keeper is turned to register the flat portion 12 of the head with the flat portion 16 of the hole, as indicated by dotted lines in Fig. 3, but normally, the location of these flat portions is such that the tension on the hook holds said flat portions at right angles or out of register with each other, in which position the keeper engages the neck 11 of the hook and is prevented from slipping off by the contact of the head with the outer side of the keeper.

To connect or disconnect the fastener, the keeper is swung over until the flat side of the head registers with the flat edge of the hole, in which position, the keeper can be slid along the link into or out of holding engagement with the end of the hook, but when the pressure is released, the tension on the hook causes the keeper to swing up to position as shown in full lines in Fig. 3, whereby the keeper is engaged behind the head and the hook cannot become unfastened. A very simple twist or turn of the parts is therefore all that is necessary to bring them to releasing position, while normally, they are held in such position that the keeper cannot slip off and so the hook is locked against accidental release.

The invention is capable of some modifications within the scope thereof.

I claim:

A fastener for chains and the like, comprising a lever hook pivoted at one end to the chain and provided at its other end with a reduced neck and enlarged head, the head being flattened at one side, and a keeper pivotally mounted on the chain to turn sidewise thereon and having a hole therein flattened at one side and through which the head may be entered to engage the keeper with said neck when turned to an abnormal position.

In testimony whereof, I affix my signature in presence of two witnesses.

NELS O. YOUNGSTROM.

Witnesses:
T. J. HAMILTON,
MARTIN MAYS.